United States Patent [19]
Ovenshire

[11] Patent Number: 6,119,400
[45] Date of Patent: Sep. 19, 2000

[54] AUTOMOTIVE WINDOW REGULATOR ASSEMBLY

[75] Inventor: H. Neil Ovenshire, Warren, Mich.

[73] Assignee: Delphi Technologies, Inc., Troy, Mich.

[21] Appl. No.: 09/216,591

[22] Filed: Dec. 18, 1998

[51] Int. Cl.[7] .............................. E05F 11/48; E05F 15/08; E05F 15/16; F16H 27/02; F16H 29/02
[52] U.S. Cl. .............................. 49/352; 49/349; 74/89.14; 74/89.13; 74/89.22
[58] Field of Search .............................. 49/352, 349, 374, 49/348, 502, 360; 74/89.22, 89.14, 89.13, 89.2; 474/148

[56] References Cited

U.S. PATENT DOCUMENTS

| | | | |
|---|---|---|---|
| 3,263,367 | 8/1966 | Tanaka | 49/349 |
| 5,142,824 | 9/1992 | Le Compagnon et al. | 49/349 |
| 5,397,277 | 3/1995 | Doring | 474/148 X |
| 5,570,606 | 11/1996 | Irie | 74/89.14 |
| 5,806,244 | 9/1998 | Tilli | 49/349 X |

Primary Examiner—Daniel P. Stodola
Assistant Examiner—Hugh B. Thompson
Attorney, Agent, or Firm—Patrick M. Griffin

[57] ABSTRACT

A regulator assembly for extending a component, e.g., window, sunroof or adjustable seat, of an automotive vehicle utilizing a flexible belt. The regulator assembly has a drive that is rotationally coupled to a first gear element having a first set of teeth. A second gear element having a second set of teeth is spaced a predetermined distance apart from the first gear element to allow the first and second sets of teeth to mesh and to allow the flexible belt to weave therebetween. The flexible belt is attached to the component, and loops around first and second belt guiding devices, e.g., pulleys, which are located on opposing sides of the first and second gear elements. The regulator assembly can further include having the second gear element rotationally coupled to the drive as well.

18 Claims, 3 Drawing Sheets

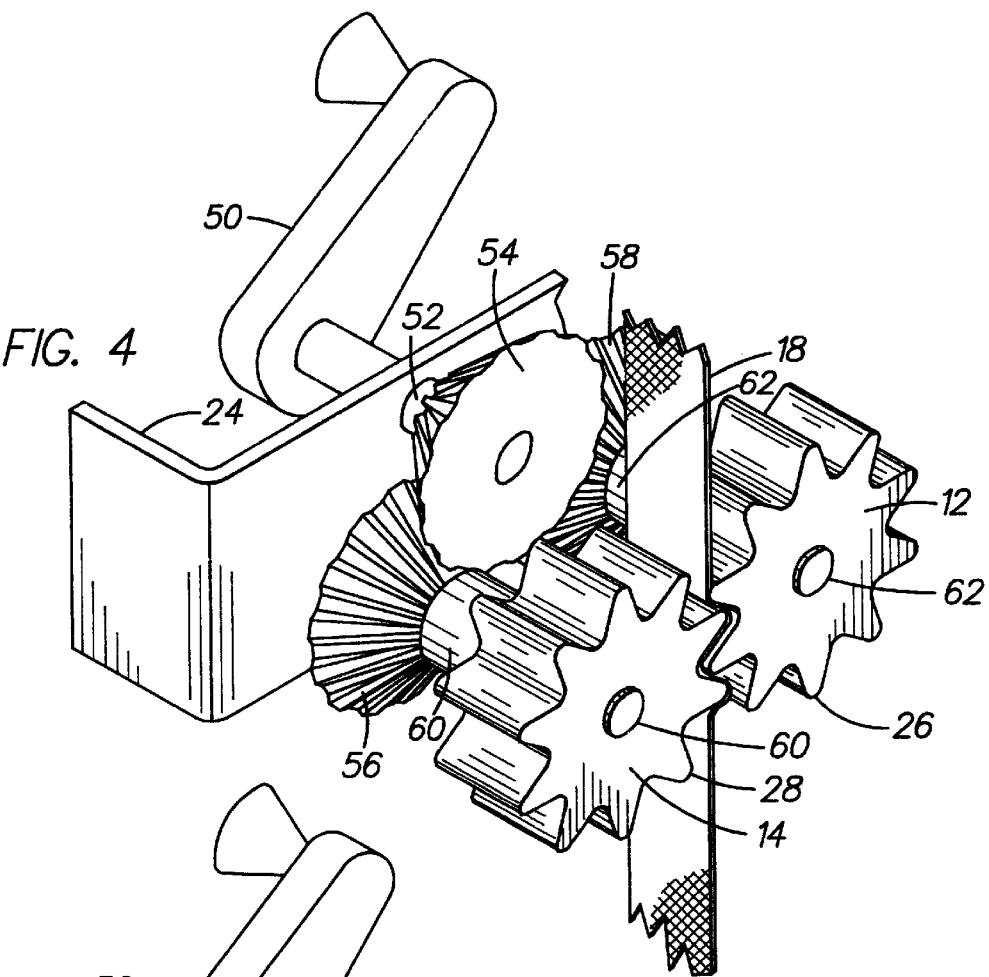
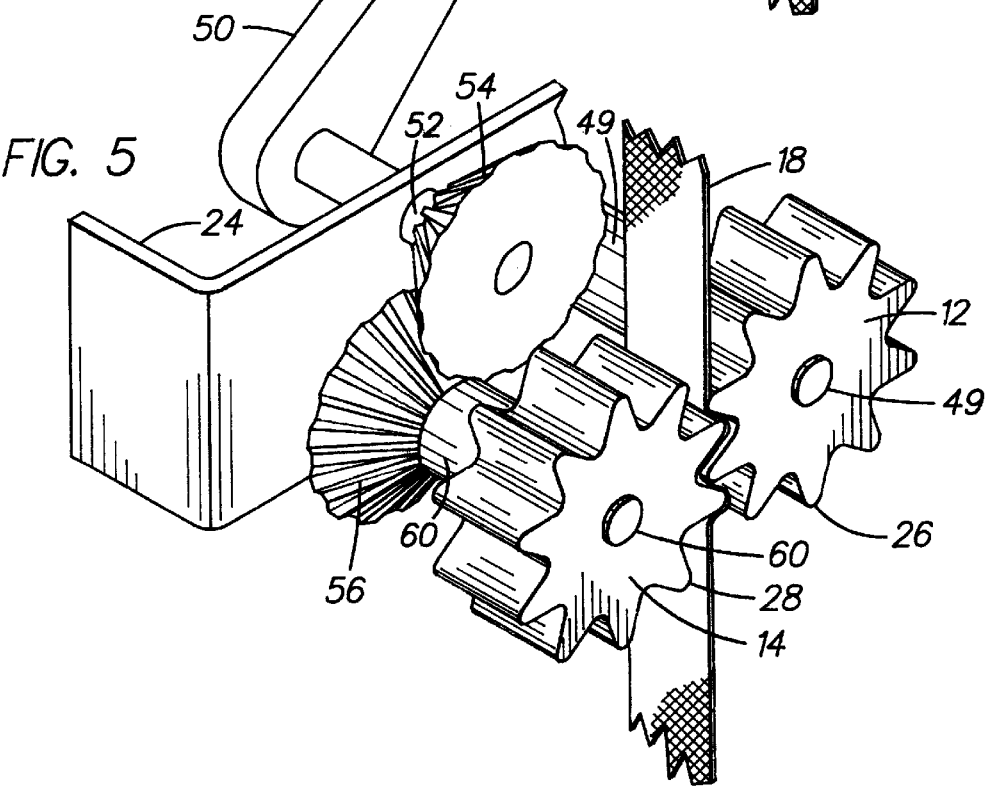

AUTOMOTIVE WINDOW REGULATOR ASSEMBLY

TECHNICAL FIELD

The present invention relates to an automotive regulator assembly and more particularly, to a regulator assembly for windows of an automotive vehicle.

BACKGROUND OF THE INVENTION

Automotive vehicles have windows that are opened and closed via regulator assemblies that are either manually operated or power controlled. A typical regulator assembly comprises a plastic tape having perforations spaced along its length. The tape is attached to the base of the window and is slidably mounted in a channel track that is fixed to the inner doorframe. The tape is routed around various guiding devices, e.g., pulleys or guide blocks, located near the belt line of the inner doorframe. The tape is additionally coupled to a tape drive, which comprises a manually operated handle or an electrically powered motor. The tape drive has teeth engaging the perforations of the tape, which push or pull the tape to slide the attached window up or down respectively. Additionally, counterbalances are often utilized to maintain the tension in the tape during operation.

Because of their stiffness, the perforated plastic tapes cannot be bent below a minimum known radius without incurring damage to the tapes. This adds to the amount of space required to assemble the regulator assembly. This also limits the distance that the windows can extend or retract, and in some cases prevents the window from retracting below the belt line of the doorframe.

Additionally the teeth of the tape drive subject the perforations within the plastic tape to a significant amount of stress during operation. As a result, the perforations tend to elongate and wear prematurely compared to the rest of the regulator assembly, therefore adding unnecessary maintenance cost and down time to the vehicle.

Due to the complexity of the aforementioned parts comprising the regulator assemblies a significant amount of volume, cost, and weight is added to the vehicle. In vehicles containing multiple regulator assemblies, the volume of the assemblies cut down on the amount of room available for other equipment, e.g., wiring harnesses or motors, and ultimately on the amount of room available to the passengers. This is especially critical in smaller vehicles where space is a premium.

SUMMARY OF THE INVENTION

This invention offers advantages and alternatives over the prior art by providing a regulator assembly for extending a component, e.g., a window or a sun roof, of an automotive vehicle utilizing a flexible belt rather than a perforated plastic tape. The flexible belt is driven by meshing teeth of first and second gear elements, through which the belt extends. Advantageously, the regulator assembly has a reduced number of parts over the prior art resulting in significant savings in cost, volume, and weight. Also the belt can be bent over much smaller diameters than the prior art perforated tape, thus reducing the amount of space required to assemble the regulator assembly. Additionally, the present invention eliminates the tape and the premature wearing problems associated with the perforations within the tape, therefore reducing maintenance costs and down time.

These and other advantages are accomplished in a preferred form of the invention by providing a regulator assembly for extending a component of an automotive vehicle utilizing a flexible belt. The regulator assembly has a drive that is rotationally coupled to a first gear element having a first set of teeth. A second gear element having a second set of teeth is spaced a predetermined distance apart from the first gear element to allow the first and second sets of teeth to mesh and to allow the flexible belt to extend therebetween. The flexible belt is attached to the component, and loops around first and second belt guiding devices, e.g., pulleys, which are located on opposing sides of the first and second gear elements.

In an exemplary embodiment of the invention, the drive of the regulator assembly is an electric motor having a motor drive shaft with a worm axially mounted on it to drive a worm gear. The first gear element is axially mounted on a worm gear drive shaft, which extends outwardly from the worm gear.

In an alternate exemplary embodiment of the invention the drive of the regulator assembly is a manually operated handle having a handle drive shaft with a spur gear axially mounted on it to drive a second spur gear. The first gear element is axially mounted on a second spur gear drive shaft, which extends outwardly from the second spur gear.

Additionally in another embodiment of the invention, the second gear element of the regulator assembly is rotationally coupled to the drive as well. This can be accomplished via an electrically operated dual worm gear drive or a manually operated dual spur gear drive.

BRIEF DESCRIPTION OF THE DRAWINGS

The present invention will now be described, by way of example only, with reference to the accompanying drawings in which:

FIG. 4 is a perspective view of a second alternative embodiment of the drive embodying the present invention having a manually operated dual spur gear drive; and FIG. 5 is a perspective view of a third alternative embodiment of the drive embodying the present invention having a manually operated single spur gear drive.

DETAILED DESCRIPTION OF THE INVENTION

Figure 1:
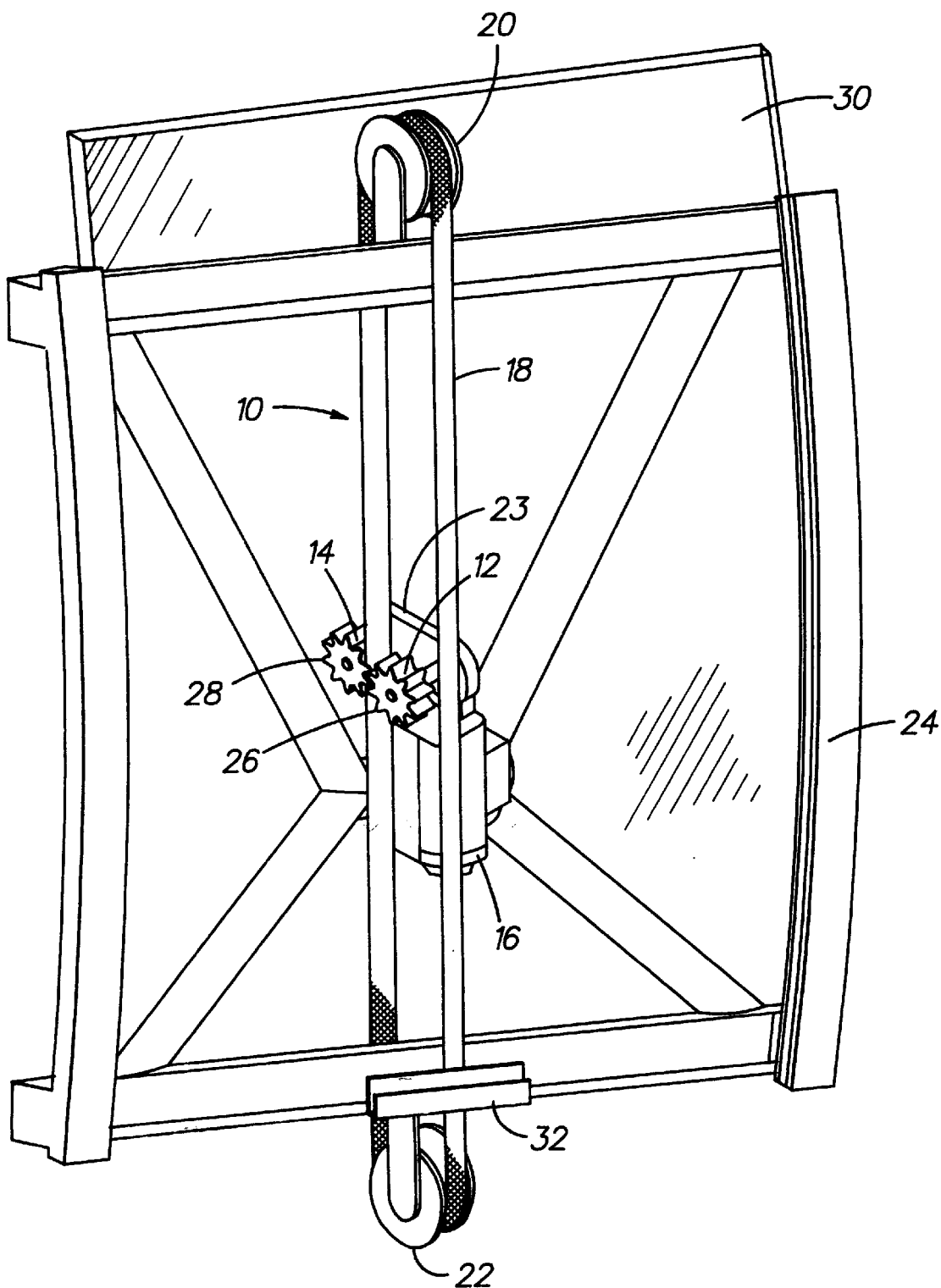
FIG. 1 is a perspective view of a window regulator assembly embodying the present invention shown mounted to an automotive door module frame.

Referring to FIG. 1, a perspective view of a window regulator assembly embodying the present invention is shown generally at 10. The window regulator assembly comprises a first gear element 12, a second gear element 14, a drive 16, a flexible belt 18, a first pulley 20 and a second pulley 22. Drive 16 is adjustably mounted to door module frame 24 to provide tension adjustment to belt 18. Drive 16 includes dual worm gears 40 and 42 (shown in FIG. 2) located in gear housing 23, which are rotationally coupled to first and second gear elements 12 and 14 respectively. First gear element 12 is constructed substantially of nylon and has a first set of rounded teeth 26. Second gear element 14 is also constructed substantially of nylon and has a second set of rounded teeth 28. The first and second gear elements 12 and 14 are spaced a predetermined distance apart to allow the first and second sets of teeth 26 and 28 to mesh, and to allow flexible belt 18 to weave therebetween. Flexible belt 18 is constructed of a webbing material, e.g., seatbelt material. Flexible belt 18 attaches to the bottom of window glass 30 via glass attachment bracket 32 and loops over first and second pulleys 20 and 22 respectively. First and second pulleys 20 and 22 are located on opposing sides of first and second gear elements 12 and 14, and are rigidly mounted to upper and lower portions of door module frame 24 respectively.

Figure 2:
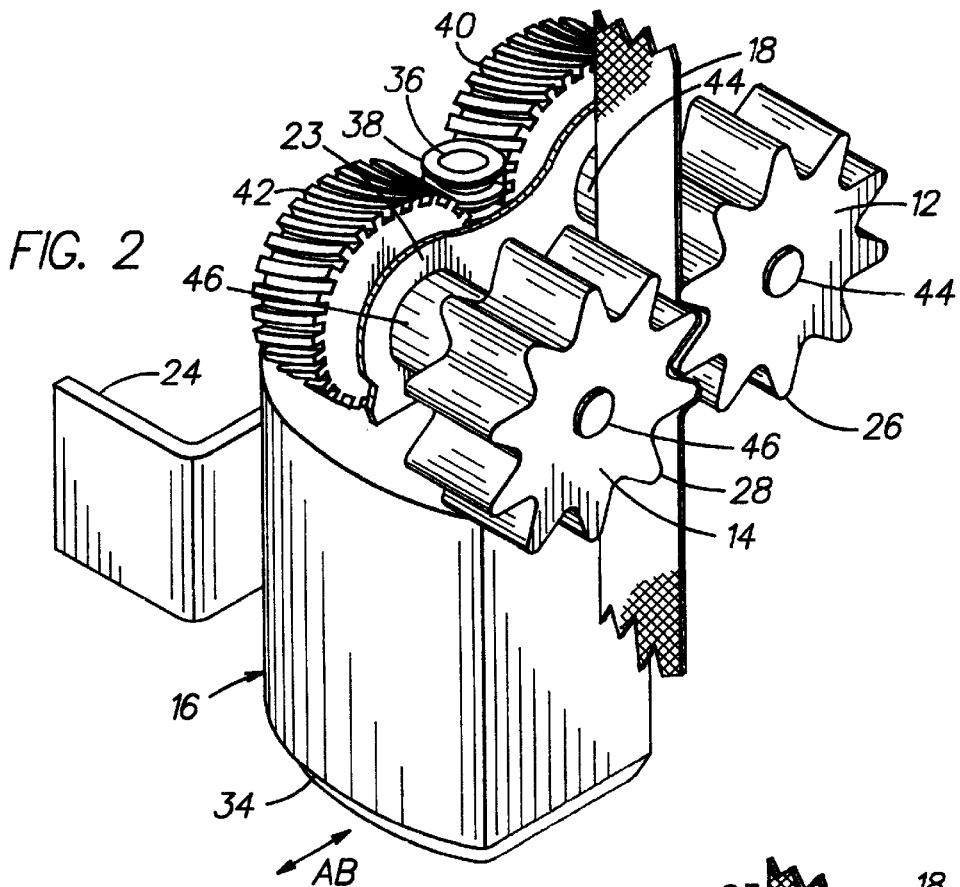
FIG. 2 is a perspective view of a drive embodying the present invention having an electrically operated dual worm gear drive.

Referring to FIG. 2, the drive 16 is adjustably mounted to door module frame 24 to adjust the tension in belt 18 through lateral movement of the drive's mounting position as shown in arrow AB. Drive 16 includes an electric motor 34 with a motor drive shaft 36 having a worm 38 mounted axially thereon. Worm 38 meshes with and drives first and second worm gears 40 and 42 in opposite directions respectively. Motor drive shaft 36, worm 38, and worm gears 40 and 42 are located within gear housing 23. A first worm gear drive shaft 44 extends outwardly from worm gear 40, through gear housing 23, and has first gear element 12 mounted thereon. A second worm gear drive shaft 46 extends outwardly from worm gear 42, through gear housing 23, and has second gear element 14 mounted axially thereon. Gear elements 12 and 14 are spaced a predetermined distance apart to allow first and second sets of teeth 26 and 28 to mesh and to further allow flexible belt 18 to weave therebetween.

When motor 34 is activated, mechanical power is transmitted through drive shaft 36 and worm 38, which drives worm gears 40 and 42 in opposite directions. Worm gears 40 and 42 in turn rotate gear elements 12 and 14 via worm gear drive shafts 44 and 46 respectively. First and second sets of meshing teeth 26 and 28 frictionally interlock on the section of flexible belt 18, which weaves therebetween. Meshing teeth 26 and 28 therefore pull flexible belt 18 around pulleys 20 and 22 as the gear elements 12 and 14 rotate to raise and lower window glass 30.

Figure 3:
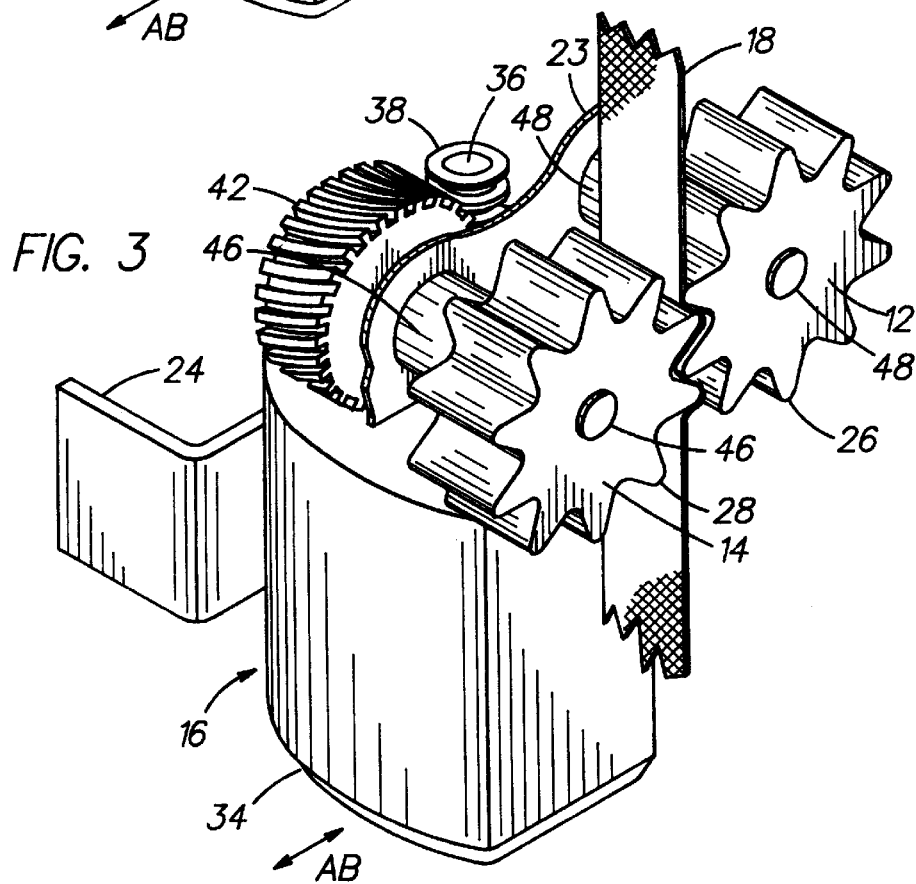
FIG. 3 is a perspective view of an alternative embodiment of the drive embodying the present invention having an electrically operated single worm gear drive.

Referring to FIG. 3, an alternative embodiment of the present invention is shown with a single worm gear drive, i.e., worm gear 40 is removed. In this exemplary embodiment, only second gear element 14 is driven by electric motor 34. An undriven gear element shaft 48 is pivotally mounted to gear housing 23 at a first distal end, and extends outwardly therefrom. First gear element 12 axially mounts and rotates freely at a second distal end of the undriven gear element shaft 48. Mechanical power is transmitted through the second worm gear 42 only, which is rotationally coupled to second gear element 14 via second worm gear drive shaft 46. Second gear element 14 meshes with and additionally drives freely rotating first gear element 12 to raise and lower window glass 30 as previously discussed.

Referring to FIGS. 4 and 5, alternative exemplary embodiments of the present invention are shown in which gear elements 12 and 14 are manually driven. A manually operated handle 50 is pivotally mounted to doorframe module 24 and has a handle drive shaft 52 which extends therethrough. First spur gear 54 is mounted to handle drive shaft 52, and drives second and third spur gears 56 and 58 in opposite directions. Second and third spur gears 56 and 58 are axially mounted to second and third spur gear drive shafts 60 and 62 respectively. Second spur gear drive shaft 60 is pivotally mounted to doorframe module 24 at a first distal end, and has second gear element 14 axially mounted thereon at a second distal end. Third spur gear drive shaft 62 is pivotally mounted to doorframe module 24 at a first distal end, and has first gear element 12 axially mounted thereon at a second distal end. Mechanical power is transmitted from the handle 50 through the spur gears 54, 56 and 58 into the first and second gear elements 12 and 14 to raise and lower the window 30 as discussed previously.

Referring to FIG. 5, a manually operated exemplary embodiment of the present invention is shown with a single spur gear drive, i.e., without third spur gear 58. In this embodiment, only second gear element 14 is driven by the manually operated handle 50. An undriven gear element shaft 49 is pivotally mounted to doorframe module 24 at a first distal end, and extends outwardly therefrom. First gear element 12 axially mounts and rotates freely at a second distal end of the undriven gear element shaft 49. Mechanical power is transmitted through the second spur gear 56 only, which is rotationally coupled to second gear element 14 via second spur gear drive shaft 60. Second gear element 14 meshes with and additionally drives freely rotating first gear element 12 to raise and lower window glass 30 as previously discussed.

It will be appreciated by one skilled in the art that, in another exemplary embodiment, handle drive shaft 52 (FIG. 5) can replace spur gears 54 and 56, as well as spur gear drive shaft 60. In this embodiment, second gear element 14 is axially mounted on a distal end of handle drive shaft 52. Therefore, the manually operated handle 50 can drive gear elements 12 and 14 directly, i.e., without spur gears 54, 56 or 58.

The exemplary embodiments of the present invention have described a regulator assembly for a window in a motor vehicle, however one would recognize that the invention can apply to other components of the motor vehicle as well, e.g., sunroofs, power doors or adjustable seats.

It will be understood that a person skilled in the art may make modifications to the preferred embodiment shown herein within the scope and intent of the claims. While the present invention has been described as carried out in a specific embodiment thereof, it is not intended to be limited thereby, but is intended to cover the invention broadly within the scope and spirit of the claims.

What is claimed is:

1. A regulator assembly for extending a component of a vehicle, said assembly comprising:

a drive including a first drive shaft;

a first gear element having a first set of teeth, said first gear element being rotationally coupled to said drive;

a second gear element having a second set of teeth, said first and second gear elements spaced a predetermined distance apart to allow said first and second sets of teeth to mesh;

a belt weaving between said first and second sets of meshing teeth, said belt for attachment to said component and being driven by actuation of the first drive shaft;

a first gear mounted on said first drive shaft;

a second gear engaging said first gear;

a first gear drive shaft extending outwardly from said second gear, said first gear drive shaft having said first gear element mounted thereon; and a second gear drive shaft having said second gear element mounted thereon, wherein said first and second gear drive shafts are substantially parallel to one another so that actuation of said first drive shaft causes said first and second gear elements to rotate about said first and second gear drive shafts resulting in said belt being driven.

2. The regulator assembly of claim 1 further comprising:

a first belt guiding device arranged to guide movement of said belt; and a second belt guiding device arranged to guide movement of said belt, said first and second belt guiding devices being located on opposing sides of said first and second gear elements.

3. The regulator assembly of claim 2 wherein said first and second belt guiding devices comprise first and second pulleys, respectfully.

4. The regulator assembly of claim 1 wherein said second gear element is rotationally coupled to said drive.

5. The regulator assembly of claim 1 wherein said drive includes an electric motor having a motor drive shaft.

6. The regulator assembly of claim 5 wherein said motor drive shaft has gear teeth as an integral part thereof.

7. The regulator assembly of claim 1 wherein said drive includes a manually operated handle having a handle drive shaft.

8. The regulator assembly of claim 7, wherein said first gear is mounted to said handle drive shaft.

9. The regulator assembly of claim 1 wherein said regulator assembly is used for extending a vehicle window.

10. The regulator assembly of claim 1 wherein said belt comprises a flexible webbing material.

11. The actuation assembly of claim 1 further comprising an adjustable mounting assembly for providing tension adjustment for said belt.

12. The regulator assembly of claim 1 wherein said first and second gears are worm gears.

13. The regulator assembly of claim 1 wherein said drive further includes:

a third gear being driven by said first gear;

a second gear drive shaft extending outwardly from said third gear, said second gear drive shaft having said second gear element mounted thereon.

14. A regulator assembly for extending a component of a vehicle, said assembly comprising:

a drive including a first drive shaft;

a first gear element having a first set of teeth, said first gear element being rotationally coupled to said drive;

a second gear element having a second set of teeth, said first and second gear elements spaced a predetermined distance apart to allow said first and second sets of teeth to mesh;

a belt weaving between said first and second sets of meshing teeth, said belt for attachment to said component and being driven by actuation of the first drive shaft;

a first gear mounted on said first drive shaft;

a second gear engaging said first gear;

a first gear drive shaft extending outwardly from said second gear, said first gear drive shaft having said first gear element mounted thereon;

a third gear being driven by said first gear; and a second gear drive shaft extending outwardly from said third gear, said second gear drive shaft having said second gear element mounted thereon, wherein said first gear is disposed between said second and third gears so that rotation of said first drive shaft causes rotation of said first gear resulting in the second and third gears being driven.

15. A method of extending a component of a vehicle, said method comprising:

meshing a first set of teeth of a first gear element with a second set of teeth of a second gear element;

weaving a belt through said first and second sets of meshing teeth;

attaching said belt to said component;

driving a first gear via a motor, said first gear being mounted on a drive shaft of said motor;

driving a second gear via said first gear;

driving said first gear element via said second gear, said first gear element being mounted on a first gear drive shaft extending outwardly from said second gear; and driving said second gear element via said first gear element, said second gear element being mounted on a second gear drive shaft, said first and second gear drive shafts being substantially parallel to one another with said belt being disposed therebetween.

16. The method of claim 15 further comprising:

arranging a first belt guiding device to guide movement of said belt, said first belt guiding device located on one side of said first and second gear elements; and arranging a second belt guiding device to guide movement of said belt, said second belt guiding device located on an opposing side of said first and second gear elements.

17. The method of claim 15 further comprising driving said second gear element via said drive.

18. The method of claim 15 wherein said driving includes:

driving said first gear via a manually operated handle, said first gear being mounted on a handle drive shaft of said manually operated handle.

* * * * *